United States Patent
Schoom

[11] 3,866,347
[45] Feb. 18, 1975

[54] PEST CONTROL UNIT

[75] Inventor: Werner Schoom, Bergen-Enkheim, Germany

[73] Assignee: Deutsche Gesellschaft fur Schadlingbekampfung GmbH, Frankfurt am Main, Germany

[22] Filed: Feb. 12, 1973

[21] Appl. No.: 331,891

[30] Foreign Application Priority Data
Feb. 11, 1972 Germany.............................. 2206487

[52] U.S. Cl....................... 43/129, 43/125, 424/27, 424/149
[51] Int. Cl........................................... A01m 19/00
[58] Field of Search...... 43/129, 131, 132 R, 132 A, 43/124; 206/46 P, 84; 424/27, 40, 149

[56] References Cited
UNITED STATES PATENTS

| | | | |
|---|---|---|---|
| 2,069,335 | 2/1937 | Salfisberg | 206/46 P |
| 3,032,915 | 5/1962 | Giroud-Abel | 43/131 |
| 3,065,124 | 11/1962 | Fike | 424/149 X |
| 3,094,805 | 6/1963 | Luck | 43/131 |
| 3,295,246 | 1/1967 | Landsman et al. | 43/131 |
| 3,605,321 | 9/1971 | Lazarus | 43/131 |
| 3,630,446 | 12/1971 | Roth et al. | 43/131 X |
| 3,719,751 | 3/1973 | Rauscher et al. | 43/131 X |
| 3,767,782 | 10/1973 | Sweeny et al. | 424/149 X |

*Primary Examiner*—James H. Czerwonky
*Attorney, Agent, or Firm*—James F. Jones

[57] ABSTRACT

Pest control agents and water soluble oxidizing materials are placed in recesses on a plastic support. This is then packaged in a gas proof metal foil bag. The control agent contains metal phosphides, and the water soluble material is selected from the group consisting of calcium hypochlorite and citric acid, chromic acid, sodium perborate with citric acid, potassium percarbonate with citric acid and sodium percarbonate with manganates.

3 Claims, 2 Drawing Figures

PEST CONTROL UNIT

This application is related to co-pending application Ser. No. 331,890 for Method of Treating Residues, Left Over After the Gas Release, of Pest Control Agents That Contain Earth Metal Phosphides and/or Alkaline Earth Metal Phosphides, filed of even date thereof.

For the control of pests, particulary insects and rodents, agents or materials are employed that contain as the active ingredient earth metal phosphides and/or alkaline earth metal phosphides. They may also contain water-repellent materials, such as hard paraffin, metal stearates, or waxlike materials, e.g., polyalcohols, and compounds such as ammonium carbamate or urea, which are decomposed by the effect of heat and/or moisture, while gas is generated. The said agents are used in powder form or as shaped bodies, such as tablets or pellets.

When such pest control agents are brought into rooms where pests are to be killed, phosphoreted hydrogen, which acts as poisonous gas, is produced by the reaction of atmospheric moisture with the earth metal phosphide or alkaline earth metal phosphide.

The residue left over after the gas release is powder-shaped.

It is known to feed powder-shaped pest control agents of the type described into bags of flexible material, e.g., of porous paper or a fine tissue, and to employ such bags for the gas release. After the end of the gas release the bags still contain residues of non-decomposed phosphides. The removal of the bags meets with great difficulties.

The object of this invention is to produce a form of employing pest control agents that contain earth metal phosphide and/or alkaline earth metal phosphide which permits a safe dispensation and removal in a simple manner of the residue left over after the end of the gas release from the room where the gas was released.

To accomplish this the pest control agent is placed in an envelope permeable to atmospheric moisture, which according to this invention consists at least partially of a wear resistant material.

The entire envelope of this invention does not need to be permeable to atmospheric moisture, but it may partially consist of an impermeable material. Particularly well suited are containers or trays which consist of entirely or partly an organic plastic, such as polyvinyl chloride or polyethylene.

In a preferred embodiment of this invention, the envelope consists of a solid foil with recesses. The pest control agent is placed, preferably in the form of shaped bodies, in these recesses. The recesses are covered by a material permeable to atmospheric moisture, e.g., by porous paper or a fine tissue.

The aforesaid related application discloses the problem of how to treat the residues remaining after the gas release, which may still contain traces of non-decomposed phosphide, with water in such a way that the remaining quantities of phosphide are completely decomposed within a short time and that the phosphoreted hydrogen produced in this process is immediately oxidized to harmless phosphoric compounds. For this purpose, the employment of materials or material mixtures is proposed which are soluble in water, having an oxidizing effect, and impart to the water a pH-value of less than 7. For this purpose, a mixture of calcium hypochlorite $Ca(OCl)_2 \cdot 3H_2O$ and citric acid is particularly well suited.

Other recommendable oxidizing agents are, e.g. chromic acid, mixtures of sodium perborate with citric acid, of potassium percarbonate with citric acid, and of sodium percarbonate with manganates.

The envelope of this invention may also be shaped in such a way that it contains, besides the pest control agent, a material or material mixture which, after the gas has been released by the pest control agent, in a treatment with water decomposes quantities of phosphoride still present in the residues and oxidizes the phosphorete hydrogen produce in this process to harmless compounds.

The means by which the objects of this invention are obtained are described more fully with reference to the accompanying drawings in which.

Figure 1:
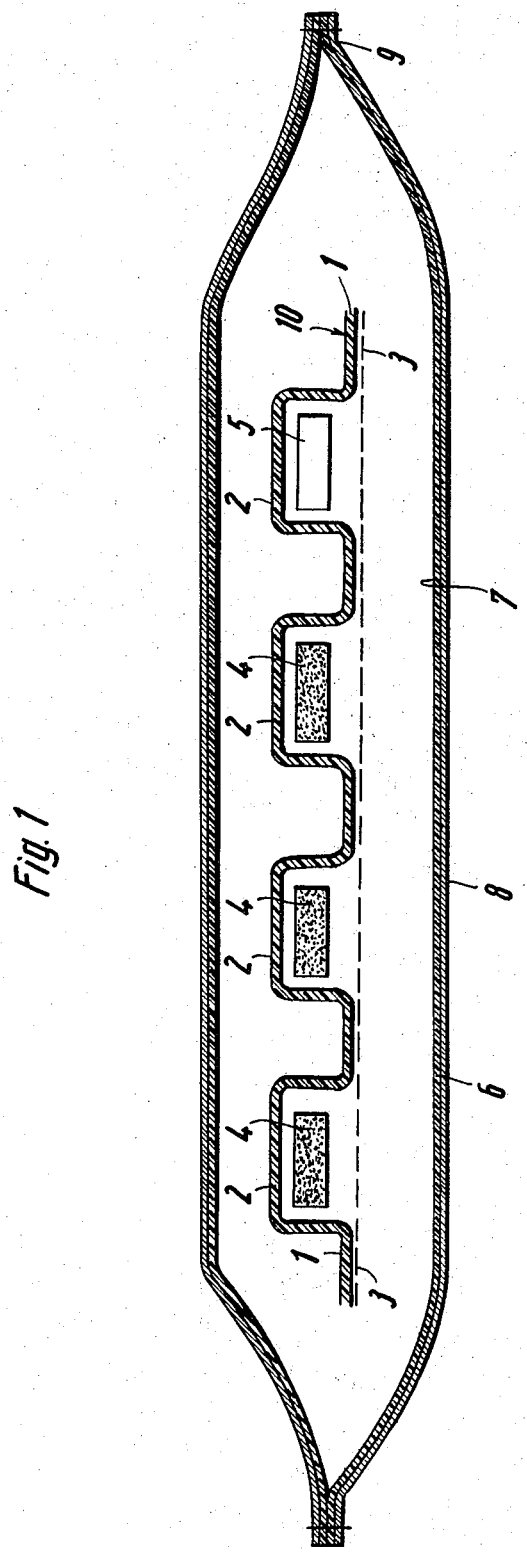
FIG. 1 is a cross-sectional view through the bag.
Figure 2:
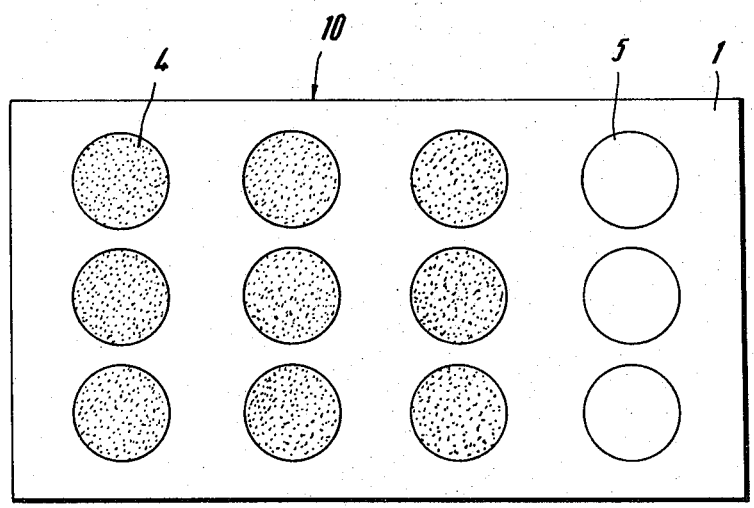
FIG. 2 is a plan view of the plastic supporting tray containing the pest control agents and oxidizing material.

In FIG. 1, such an embodiment is shown by way of example. It consists of a thick foil 1 of polyvinyl chloride wherein recesses or burls 2 are made by punching. On the bottom side there is a sheet 3 of porous Japanese paper permeable to water vapor, which between the recesses is sealed to the foil. In the recesses there are tablets 4 of the pest control agent, and tablets 5, consisting of a mixture of calcium hypochlorite, citric acid and a small quantity of a redox indicator.

Both types of tablets 4 and 5 can be manufactured mechanically and correctly proportioned and are introduced into the recesses of burls 2 before the Japanese paper is sealed on.

When such an embodiment is brought into a room where the gas is to be released, the tablets 4 of the pest control agent are decomposed by the effect of atmospheric moisture which penetrates the sheet of material permeable to water vapor and gas thus generating phosphoreted hydrogen.

The sizes and amounts of the tablets of pest control agent and the mixture of calcium hypochlorite, citric acid and redox indicator are chosen in such a way that even if the gas release is incomplete, non-decomposed phosphide is no longer contained in the residues within a very short time after the start of the treatment of this invention, and the phosphoreted hydrogen generated in this process is completely oxidized to harmless compounds.

There are in each bag 6 on foil 1 correctly measured amounts of both tablets 4 and 5 which are adapted to a specific room size, e.g., for 10 cubic meters. The dispensation form 10 contained in bag 6 can easily be removed by tearing open sealed end edges 9 of bag 6 or cutting them off with scissors, and then be deposited in the room where the gas is to be released. The room must then remain closed for a correct period of time, whereby the pests are safely destroyed.

After the gas has been released, the entire set is put, e.g., into a bucket with water. The non-decomposed tablets 5 of calcium hypochlorite, citric acid and redox indicator are dissolved in the water. This solution reaches through the pores of the Japanese paper the residues of tablets 4 of the pest control agent, decomposes the traces of phosphides contained therein, and oxidizes the phosphoreted hydrogen generated in this process to harmless compounds.

For storage and transportation the entire set is placed in a bag 6 composed of an aluminum foil 8 covered with plastic material 7 and impermeable to gas. The end edges 9 of this foil are sealed together in a gastight manner. A plurality of such bags 6 may be placed in a gastight container of metal or plastic material.

Having now described the means by which the objects of this invention are obtained,

I claim:

1. A pest control unit comprising a tray having a plurality of recesses therein, a pest control material containing metal phosphides in at least one of said recesses of a type to generate a pest controling gas when subjected to atmospheric moisture, and a water soluble material in at least one other of said recesses, said water soluble material comprising a material selected from the group consisting of $Ca(OCl)_2 \cdot 3H_2O$ and citric acid, chromic acid, sodium perborate with citric acid, potassium percarbonate with citric acid and sodium percarbonate with manganates, said material being chemically such that, upon the tray with the materials in said recesses being immersed in water, the water soluble material is dissolved and decomposes any residue of said pest control material to render it incapable of further generation of the pest control gas.

2. The pest control unit of claim 1 in which a film of moisture- and gas permeable material is mounted to cover said recesses to retain the materials therein.

3. The pest control unit of claim 2 in which said unit is placed for shipment and storage in a moisture and gastight container.

* * * * *